Figure 1:
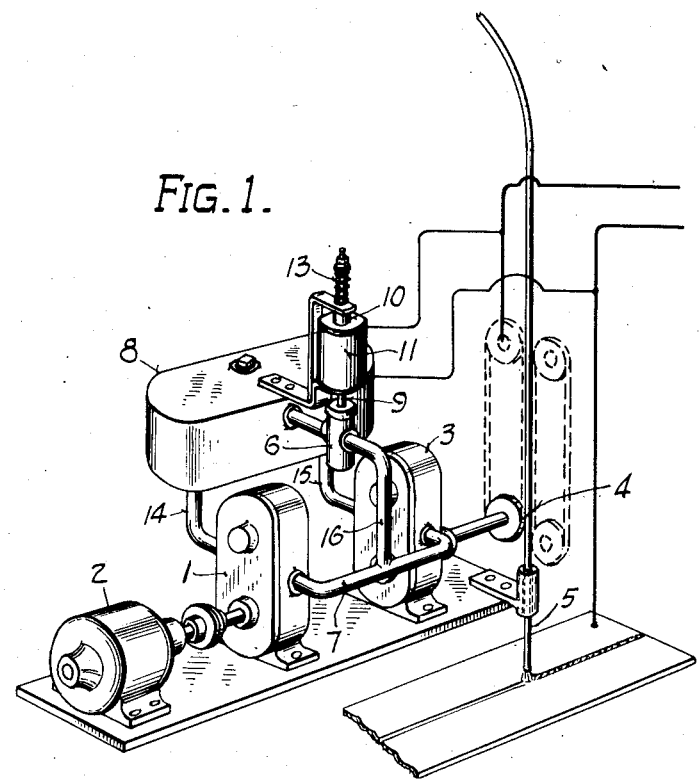

April 7, 1942.  W. E. CRAWFORD  2,278,975
AUTOMATIC ARC WELDING HEAD
Filed July 22, 1940

William E. Crawford
INVENTOR.

BY *[signature]*
ATTORNEY.

Patented Apr. 7, 1942

2,278,975

UNITED STATES PATENT OFFICE 2,278,975

AUTOMATIC ARC WELDING HEAD

William E. Crawford, Wauwatosa, Wis., assignor to A. O. Smith Corporation, Milwaukee, Wis., a corporation of New York Application July 22, 1940, Serial No. 346,746

2 Claims. (Cl. 219—8)

This invention relates to automatic arc welding heads.

The object of the invention is to provide a head for automatically feeding an electrode to a welding arc, in which the parts are rugged and relatively less costly than those heretofore employed and in which the efficiency of the head is not affected by wear of the parts.

Another object of the invention is to provide a compact and simple fluid pressure operated head for feeding a weldrod and in which the fluid is circulated continuously with a regulator for its flow through the driving means in response to a characteristic of the welding arc.

Other objects will appear hereinafter in connection with the description of the preferred embodiment of the invention illustrated in the accompanying drawing.

Figure 2:
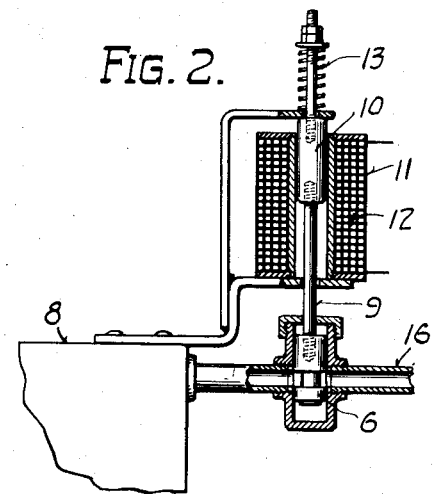

In the drawing:

Figure 1 is a perspective view of the welding head showing certain parts diagrammatically; and Fig. 2 is a vertical section through the balanced control valve and its operating solenoid.

In accordance with the invention the head comprises a hydraulic pump 1, of the rotary positive displacement type, driven by a substantially constant speed electric motor 2, and driving a hydraulic motor 3, also of the rotary positive displacement type, which in turn drives the feeding mechanism 4 for advancing the weldrod 5 to the welding arc. For the fluid to be used it is best to employ a relatively incompressible oil or other suitable power transmitting medium.

The speed of the motor 3 is controlled in accordance with variations in the welding arc to maintain the latter substantially constant. This is accomplished by providing a balanced bleeder valve 6 in the line 7 which relieves the pressure and controls the bleeding of the fluid from the line to the storage reservoir 8.

The valve 6 is mounted on a vertical rod 9 connected at its upper end to the core 10 of a solenoid 11. The solenoid 11 has its winding 12 connected either in series with the welding arc or in shunt thereto, depending upon the characteristic of the arc desired to be employed for control. In the drawing the winding 12 is connected in shunt to the arc for A. C. welding.

The core 10 is suspended at its upper end by means of an adjustable spring 13 with the magnetic portion of the core slightly above its position in the solenoid when the winding is energized. Operation of the solenoid therefore tends to pull the core 10 downwardly against the tension of spring 13. By adjusting the spring 13 the resistance to the magnetic pull on the core is varied and the operating position of the valve raised or lowered to maintain an arc of given length and characteristics.

The valve 6 is of the frictionless balanced type so that variations in pressure will not affect its operation.

The reservoir 8 is preferably located above the pump 1 and motor 3 and is connected to the same by ducts 14 and 15, respectively. Duct 14 carries oil from reservoir 8 to the inlet of pump 1, while duct 15 returns oil from the outlet of motor 3 to the reservoir 8. The valve 6 is located in a duct or passage 16 extending from line 7 to the reservoir 8. The line 7 extends from the outlet of pump 1 to the inlet of motor 3.

In operation, when the welding arc becomes too long, the resistance of the arc increases, forcing more current through the shunt circuit including the winding 12. This causes the solenoid 11 to pull the core 10 downwardly farther and by means of rod 9 effects a greater closing of valve 6 thereby preventing as great a bleeding of fluid from line 7. Pressure builds up in line 7 and causes the motor 3 to speed up and feed the weldrod 5 to the arc at a faster rate.

Should the arc become too short, the feed of the weldrod 5 is reduced in rate by the lighter pull of the solenoid 11 on core 10 raising the valve 6 to allow greater relief of pressure from line 7 and consequent slowing of motor 3.

The welding head is rugged and its operation is not seriously affected by wear of parts. A reasonable amount of leakage of fluid in either the pump 1 or motor 3 will not change the rate of feed of the weldrod 5, since both the pump and motor are constructed with excess capacity and the bleeder valve 6 will control the pressure in line 7 to give the required feed of weldrod 5.

The invention may have various embodiments within the spirit and scope of the accompanying claims.

I claim:

1. An automatic arc welding head for feeding substantially continuous lengths of welding electrode to a welding arc, comprising a reservoir for relatively incompressible power fluid, a rotary positive displacement pump to provide a flow of power fluid of substantially constant volume, means to supply power fluid to said pump from said reservoir, and a closed return circuit for power fluid from said pump to said reservoir having two parallel paths, a compact rotary positive displacement motor disposed in one of said return paths to be operated by the power fluid passing therethrough to drive the feeding mechanism for said welding electrode, and a control valve in the other path of said return circuit responsive to a characteristic of the welding arc to vary the supply of fluid to said motor to regulate the rate of feed of the electrode.

2. An automatic arc welding head for feeding substantially continuous lengths of welding electrode to a welding arc, comprising a reservoir for relatively incompressible power fluid, a positive displacement pump to provide a flow of power fluid, means to supply power fluid to said pump from said reservoir, a closed return circuit for power fluid from said pump to said reservoir, a positive displacement motor disposed in said return circuit to be operated by the power fluid passing therethrough to drive the feeding mechanism for said welding electrode, and a control valve responsive to a characteristic of the welding arc to vary the supply of fluid passing directly to said motor from said pump to regulate the rate of feed of the electrode.

WILLIAM E. CRAWFORD